(12) United States Patent
Arakawa et al.

(10) Patent No.: US 7,082,515 B2
(45) Date of Patent: Jul. 25, 2006

(54) DATA DRIVEN TYPE INFORMATION PROCESSING APPARATUS HAVING DEADLOCK BREAKING FUNCTION

(75) Inventors: Kazuya Arakawa, Yaita (JP); Motoki Takase, Yamatokoriyama (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 631 days.

(21) Appl. No.: 09/842,763

(22) Filed: Apr. 27, 2001

(65) Prior Publication Data

US 2001/0037440 A1    Nov. 1, 2001

(30) Foreign Application Priority Data

Apr. 27, 2000   (JP)   ............................. 2000-127342

(51) Int. Cl.
*G06F 15/00* (2006.01)

(52) U.S. Cl. ...................................................... 712/25
(58) Field of Classification Search .................. 712/25, 712/26, 27, 201, 18
See application file for complete search history.

(56) References Cited

U.S. PATENT DOCUMENTS 5,373,204 A    12/1994 Muramatsu et al.
5,404,539 A  *  4/1995 Onozaki ...................... 710/240

FOREIGN PATENT DOCUMENTS

| JP | 61-276033    |   | 12/1986 |
|----|--------------|---|---------|
| JP | 03029047 A   | * | 2/1991  |
| JP | 6-83731      |   | 3/1994  |
| JP | 09-081540    |   | 3/1997  |

OTHER PUBLICATIONS

Komori et al., "Multiprocessor and method of Initializing Same", Feb. 7, 1991, English Translation of above Cited Japanese Patent No. 03029047A.*
Silberschatz and Galvin. "Module 7: Deadlocks". © 1998 http://www.csee.umbc.edu/courses/undergraduate/CMSC421/Fall99/Burt/bell-labs/mod7.1.pdf.*
Rosenberg, Jerry M. "Dictionary of Computers, Information Processing & Telecommunications". Second Edition. New York: John Wiley & Songs, Inc., © 1987. p. 239.*

\* cited by examiner

*Primary Examiner*—Eddie Chan
*Assistant Examiner*—Aimee J. Li
(74) *Attorney, Agent, or Firm*—Birch,Stewart,Kolasch & Birch, LLP

(57) ABSTRACT

A C element controls a pipeline register and successively transfers data packets. When a dead-lock state occurs, a data packet in the pipeline register is erased by a master reset signal, a host transfer flag operating circuit overwrites a data packet in the pipeline register so that it has a host transfer flag at the "H" level, and thereafter, when the host transfer flag is detected in the subsequent stage, the data packet is transferred to the host.

11 Claims, 9 Drawing Sheets

FIG.5 PRIOR ART
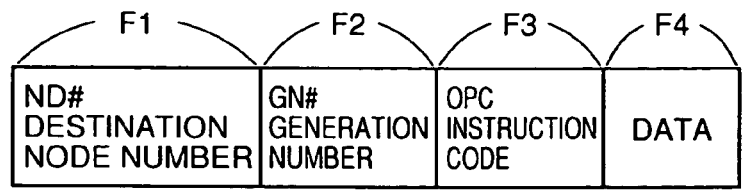
FIG.6 PRIOR ART
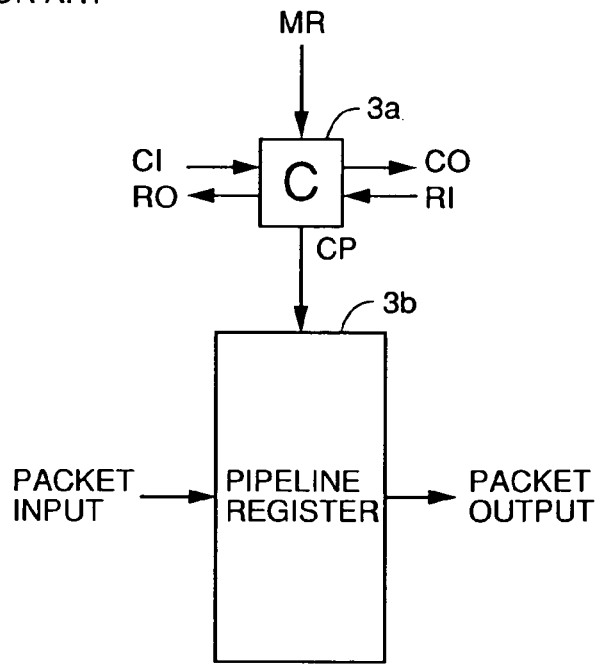
FIG.7A PRIOR ART    CI
FIG.7B PRIOR ART    RO
FIG.7C PRIOR ART    CP
FIG.7D PRIOR ART    CO
FIG.7E PRIOR ART    RI

DATA DRIVEN TYPE INFORMATION PROCESSING APPARATUS HAVING DEADLOCK BREAKING FUNCTION

BACKGROUND OF THE INVENTION

1. Field of the Invention

The present invention relates to a data driven type information processing apparatus. More specifically, the present invention relates to a data driven type information processing apparatus having such a function that erases at least one data packet on a circulation pipeline, and transfers another data packet on the circulation pipeline to a host.

2. Description of the Background Art

Along with recent development of multi-media applications, a large amount of operations are required in image processing, for example. A data driven type information processing apparatus (hereinafter referred to as a data driven type processor) has been proposed as an apparatus for processing such a large amount of operations at high speed. In a data driven type processor, a process proceeds in accordance with the rule that when input data necessary for executing a certain process are all prepared, and resources including an arithmetic processor necessary for that process are allocated, the process is executed.

A data processing apparatus including information processing operation of the data driven type uses a data transmitting apparatus employing asynchronous handshake method. In such a data transmitting apparatus, a plurality of data transmission paths are connected, and the data transmission paths transmit/receive data transmission request signals (hereinafter referred to as SEND signals) and transfer acknowledge signal (hereinafter referred to as ACK signals) indicating whether data transfer is permitted or not, with each other, whereby autonomous data transfer is performed.

FIG. 5 represents a data packet format applied to the prior art and to the present invention. Referring to FIG. 5, a data packet includes a destination node number field F1 storing a destination node number ND#; a generation number field F2 storing a generation number GN#; an instruction code field F3 storing an instruction code OPC; and a data field F4 storing data DATA. The generation number is a number for distinguishing data groups to be processed in parallel from each other. The destination node number is a number for distinguishing input data of the same generation from each other. The instruction code is for executing an instruction stored in an instruction decoder.

FIG. 6 is a block diagram showing a configuration of the data transmission path. The data transmission path includes a self-synchronous type transfer control circuit (hereinafter referred to as a C element) 3a, and a data holding circuit (hereinafter referred to as a pipeline register) 3b including a D type flip-flop. The C element 3a has a pulse input terminal CI receiving a pulse; a transfer acknowledge output terminal RO outputting a transfer acknowledge signal indicating permission or inhibition of transfer; a pulse output terminal CO outputting a pulse; a transfer acknowledge input terminal RI receiving the transfer acknowledge signal indicating permission or inhibition of transfer; and a pulse output terminal CP for providing a clock pulse controlling data holding operation of pipeline register 3b.

FIGS. 7A to 7E are timing charts representing the operation of the C element shown in FIG. 6.

C element 3a receives a pulse shown in FIG. 7A from terminal CI, and when the input transfer acknowledging signal such as shown in FIG. 7E provided from terminal RI represents a transfer permitted state, it outputs a pulse shown in FIG. 7D from terminal CO, and outputs a pulse shown in FIG. 7C to pipeline register 3b. In response to the pulse applied from C element 3a, pipeline register 3b holds the applied input packet data, or provides the held data as an output packet data.

FIG. 8 is a block diagram showing the data transmission path shown in FIG. 6 connected sequentially through a prescribed logic circuit. Referring to FIG. 8, an input packet data is transferred in the order of pipeline registers $4a \rightarrow 4b \rightarrow 4c$, while sequentially processed by logic circuits $6a$ and $6b$. When pipeline register $4a$ is in a data holding state, for example, and the succeeding pipeline register $4b$ is in the data holding state, data is not transmitted from pipeline register $4a$ to pipeline register $4b$.

When the succeeding pipeline register $4b$ is in a state not holding data, or when it enters a state not holding data, the data is transmitted from pipeline register $4a$, processed by logic circuit $6a$ and fed to pipeline register $4b$ with at least a preset delay time. Such a control in which data is transferred asynchronously with at least a preset delay time, in accordance with the SEND signal input/output at CI and CO terminals and ACK signals input/output at RI and RO terminals between adjacent connected pipeline registers is referred to as a self-synchronous transfer control, and a circuit controlling such a data transfer is referred to as a self-synchronous transfer control circuit.

FIG. 9 is a specific circuit diagram of the C element shown in FIG. 6. The C element is described, for example, in U.S. Pat. No. 5,373,204. Referring to FIG. 9, pulse input terminal CI receives a pulse-shaped SEND signal (transfer request signal) from a preceding stage, and a transfer acknowledge output terminal RO provides the ACK signal (transfer acknowledge signal) to the preceding stage. Pulse output terminal CO provides the pulse-shaped SEND signal to a succeeding stage, and the transfer acknowledge input terminal RI receives the ACK signal from the succeeding stage.

A master reset input terminal MR receives a master reset signal. When a pulse at the "H" (high) level is applied to master reset input terminal MR, it is inverted by an inverter 5F to the "L" (low) level, flip-flops $5a$ and $5b$ are reset, and the C element is initialized. Pulse output terminal CO and transfer acknowledge output terminal RO both output the "H" level signals as the initial state. That the output of transfer acknowledge output terminal RO is at the "H" level indicates the transfer permitted state, whereas the output being at the "L" level indicates a transfer inhibited state. The output of pulse output terminal CO being the "H" level represents a state in which data transfer from the succeeding stage is not requested, while the output being at the "L" level represents a state in which data transfer is requested or data is being transferred from the succeeding stage.

When the "L" level signal is input to pulse input terminal CI, that is, when a data transfer request is issued from the preceding stage, flip-flop $5a$ is set, and provides the "H" level signal at its output Q. The "H" level signal is inverted by inverter $5g$, whereby the "L" level signal is output from transfer acknowledge input terminal RO, inhibiting further data transfer.

After a prescribed time period, the "H" level signal is input to pulse input terminal CI, and data set from the preceding stage to the C element is completed. When, in this state, the "H" level signal is input from transfer acknowledge input terminal RI, that is, data transfer is permitted by the succeeding stage, and in addition, the "H" level signal is output from pulse output terminal CO, that is, when data is not being transferred to the succeeding stage (data transfer request is not issued to the succeeding stage), then NAND gate 5c is rendered active, providing the "L" level signal.

As a result, flip-flops 5a and 5b are both reset, and flip-flop 5b provides the "H" level signal from pulse output terminal CP to the pipeline register through a delay element 5e, and provides the SEND signal at the "L" level from pulse output terminal CO to the C element of the succeeding stage through a delay element 5d. More specifically, data transfer request is issued to the succeeding stage. The C element of the succeeding stage, receiving the SEND signal at the "L" level, outputs the ACK signal set to the "L" level, representing transfer inhibition, from the RO terminal, so as to prevent further data transfer to the C element.

The C element receives the ACK signal at the "L" level from the transfer acknowledge input terminal RI, and by this signal, flip-flop 4b is set. As a result, the "L" level signal is output from pulse output terminal CP to the pipeline register through delay element 5e, and the SEND signal at the "H" level is output from the pulse output terminal CO to the succeeding stage through delay element 5d, and thus data transfer is completed.

FIG. 10 is a schematic block diagram of a conventional data driven type information processing apparatus implemented including the data transfer path shown in FIG. 8. Referring to FIG. 10, the data driven type information processing apparatus Pe includes a junction unit JNC, a firing control unit FC, a processing unit FP, a program storing unit PS, a branching unit BRN, a plurality of pipeline registers 4a to 4c and a plurality of C elements 2a to 2c. Respective C elements 2a to 2c control packet transfer with the corresponding processing units (FC, FP, PS) by exchanging packet transfer pulses (signals at CI, CO, RI and RO) between the C elements of the preceding and succeeding stages. Respective pipeline registers 4a to 4c take in and hold data input from the processing unit of the preceding stage in response to the pulse inputs from corresponding C elements 2a to 2c, feed the data to the output stage, and hold the data until the next pulse is input.

Referring to FIG. 10, when the data packet shown in FIG. 5 is input to the processor Pe, the input packet is first passed through junction unit JNC, transmitted to firing control unit FC, and a data pair is formed between packets having the same destination node number and the same generation number. More specifically, two different data packets having identical node number and the generation number are detected, and of these two having the same numbers, one data packet is additionally stored in the data field F4 (FIG. 5) of the other data packet, and the resulting data packet is output. The data packet storing the data pair (a set of data) in the data field F4 is then transmitted to operating unit FP. The operating unit FP receives the transmitted data packet as an input, based on the instruction code OPC of the input packet, performs a prescribed operation on the contents of the input packet, and stores the result of operation in the data field F4 of the input packet. Thereafter, the input packet is transmitted to program storing unit PS.

The program storing unit receives as an input the transmitted data packet, and reads, based on the destination node number ND# of the input packet, the node information (node number ND#) to which the packet should go, instruction information (instruction code OPC) to be executed next, and a copy flag CPY, from the program memory of the program storing unit PS. The read destination node number ND# and the instruction code OPC are stored in the destination node number field F1 and the instruction code field F3 of the input packet, respectively. Further, when the read copy flag CPY is "1", the next address of the program memory is also determined to be valid, and a packet is generated which stores the destination node number ND# and the instruction code OPC that are stored at the next address.

The packet output from the program storing unit PS is transmitted to branching unit BRN and output or returned again to the processor, based on the destination node number ND#.

In a data driven type information processing apparatus, because of a lag in the order of arrival of data packets or because of dependency between data, a dead-lock state sometimes occurs, hindering execution of all subsequent operations. This phenomenon will be described with reference to FIG. 11. Assume, for example, that n packets (memory packet 1-memory packet n) are stored in the memory of firing control unit FC shown in FIG. 10, and there is no empty field. When a data packet 1 shown in FIG. 11 is input to firing control unit FC, the destination node number and the generation number of the tab held by the packet are compared with the destination node number and the generation number of a tag of a packet that has been stored in the internal memory. When arrival of a counterpart data packet 2 having the same tag is delayed and the counterpart packet cannot be detected, the data packet 1 is not stored in the memory as there is no empty space in the internal memory but directly output to a circulation pipeline. When the data packet 2 is input to the firing control unit FC thereafter, data packet 1 cannot be detected, and therefore, this data packet is also output directly to the circulation pipeline. In order that the data packet 1 or data packet 2 is stored in the memory in the firing control unit FC, it is necessary that any of the data packets stored in the memory of firing control unit FC has a tag matching the tag of any packet on the circulation pipeline and there is an empty space in the memory, making an empty space in the memory in the firing control unit FC.

When the data dependency of the program is as shown in FIG. 11, however, the data packet 1 is directly output to the circulation pipeline at first and data packet 2 input subsequently is also output to the circulation pipeline without firing and without executing any instruction, when there is no empty space in the memory in the firing control unit FC and the data packets 1 and 2 are input at different timings.

After the data packets 1 and 2 are circulated through the circulation pipeline and arrive the firing control unit FC, the situation is the same. Therefore, the n memory packets stored in the memory are all kept permanently un-fired, and therefore the memory is kept full.

When new data packets are input from the junction unit JNC and added to the circulating data packets, eventually, transfer from a pipeline to another pipeline becomes impossible, resulting in the dead-lock state.

When the dead-lock state occurs and subsequent execution is completely hindered, or at the start of executing a program, it is necessary to initialize the data driven type information processing apparatus PE. For this purpose, a pulse at the "H" level is applied to the master reset input terminal MR of the self-synchronous transfer control circuit shown in FIG. 8, so as to initialize all the C elements 2a to 2e and the data driven type information processing apparatus PE.

Thus, pulse output terminal CO and transfer acknowledge output terminal RO are both set to the initial state, providing the "H" level signals notifying that it is the transfer permitted state to the preceding stage and not requesting data transfer from the succeeding stage. Therefore, the data held by the pipeline register at the time of master reset is not transmitted to the pipeline register of the succeeding stage, and the data packet is overwritten by the data transmitted from the pipeline register of the preceding stage and eliminated. Thus, the data packets in all the pipeline registers are eliminated.

As described above, when the circulation pipeline comes to be dead-lock, preventing execution of all the subsequent operations, initialization is possible by a master reset input. As the circulation pipeline circulates returning from the branching unit BRN to the junction unit JNC as shown in FIG. 10, it has been difficult to find the cause of the dead-lock, even when the data packets on the circulation pipeline are all erased.

SUMMARY OF THE INVENTION

Therefore, an object of the present invention is to provide a data driven type information processing apparatus having such a function that solves the dead-lock state of the circulation pipeline and, in addition, transferring other data packets on the circulation pipeline to the outside.

In the present invention, data packets are stored in the pipeline register while transfer and operation processes of data packets including at least a destination number, a generation number, an instruction code and data are controlled by a self-synchronous transfer control circuit, in response to a transfer request signal and a transfer acknowledge signal, whether a data packet is to be circulated inside or to be output to the outside is controlled by an input/output control circuit, and a data packet stored in at least one of the pipeline registers is erased and other packet is externally output by a data packet output circuit.

Therefore, according to the present invention, there is a function of eliminating a data packet stored in a pipeline register and externally outputting other data packet. Therefore, the dead-lock state of the circulation pipeline is resolved, and in addition, other data packets on the circulation pipeline can be transferred to an external host. Therefore, information of the data packet which is the cause of the dead-lock state can be easily obtained, and thus, a data driven type information processing apparatus having effective debugging function is realized.

The data packet erasing circuit is provided in the input/output control circuit. More preferably, a host transfer flag operating circuit is provided in a block nearest to an outlet of the data driven type information processing apparatus as one of the blocks performing the operating process.

More preferably, a circuit is provided that detects a host transfer flag in a data packet and outputting the data packet to the outside in accordance with the host transfer flag.

According to another aspect of the present invention, data packets are stored in a pipeline register while transfer and operating processes of the data packet including at least a destination node number, a generation number, an instruction code and data are controlled by a self-synchronous transfer control circuit, in response to a transfer request signal and a transfer acknowledge signal, whether a data packet is to be circulated inside or to be output to the outside is controlled by an input/output control circuit, a data packet stored in at least one of the pipeline registers is erased and other data packet is externally output by a data packet output circuit, a new host transfer flag is added to a data packet by a data packet erasing circuit, a data packet is erased in accordance with master reset information for erasing at least one data packet, host transfer flags of other data packets are overwritten in accordance with the master reset information by a plurality of host transfer flags operating circuits, and the host transfer flags are detected by the host transfer flag detecting circuits.

According to a further aspect of the present invention, data packets are stored in a pipeline register while transfer and operating processes of the data packet including at least a destination node number, a generation number, an instruction code and data are controlled by a self-synchronous transfer control circuit, in response to a transfer request signal and a transfer acknowledge signal, whether a data packet is to be circulated inside or output to the outside is controlled by an input/output control circuit, a data packet stored in at least one of the pipeline registers is erased and other data packet is output externally by a data packet output circuit, a new host transfer flag is added to a data packet by a data packet erasing circuit, the data packet is erased by master reset information for erasing at least one data packet, the master reset information is stored by a plurality of host transfer flag operation circuits, input other data packets are output with the host transfer flags overwritten, and the host transfer flags are detected by a host transfer flag detecting circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a data packet format applied to the prior art and to the embodiments of the present invention.

FIG. 6 is a block diagram showing an example of a conventional data transmission path.

FIGS. 7A to 7E are timing charts of the C element shown in FIG. 6.

DESCRIPTION OF THE PREFERRED EMBODIMENTS

Figure 1:
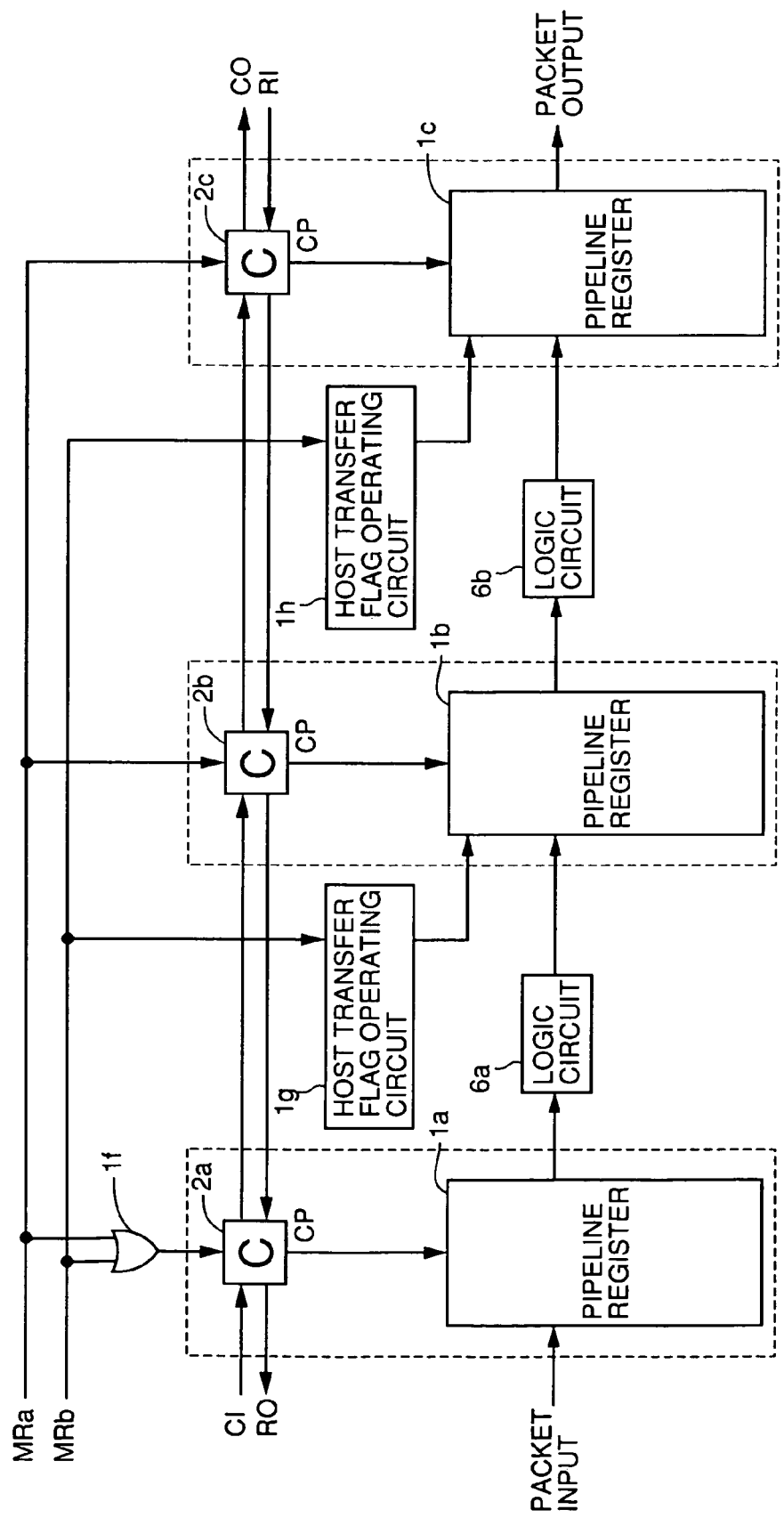
FIG. 1 is a block diagram of a data transmission apparatus employing the handshake method, in accordance with an embodiment of the present invention.

FIG. 1 is a block diagram showing the data transmission apparatus used in the data driven type information processing apparatus employing the handshake method, in accordance with one embodiment of the present invention.

Figure 8:
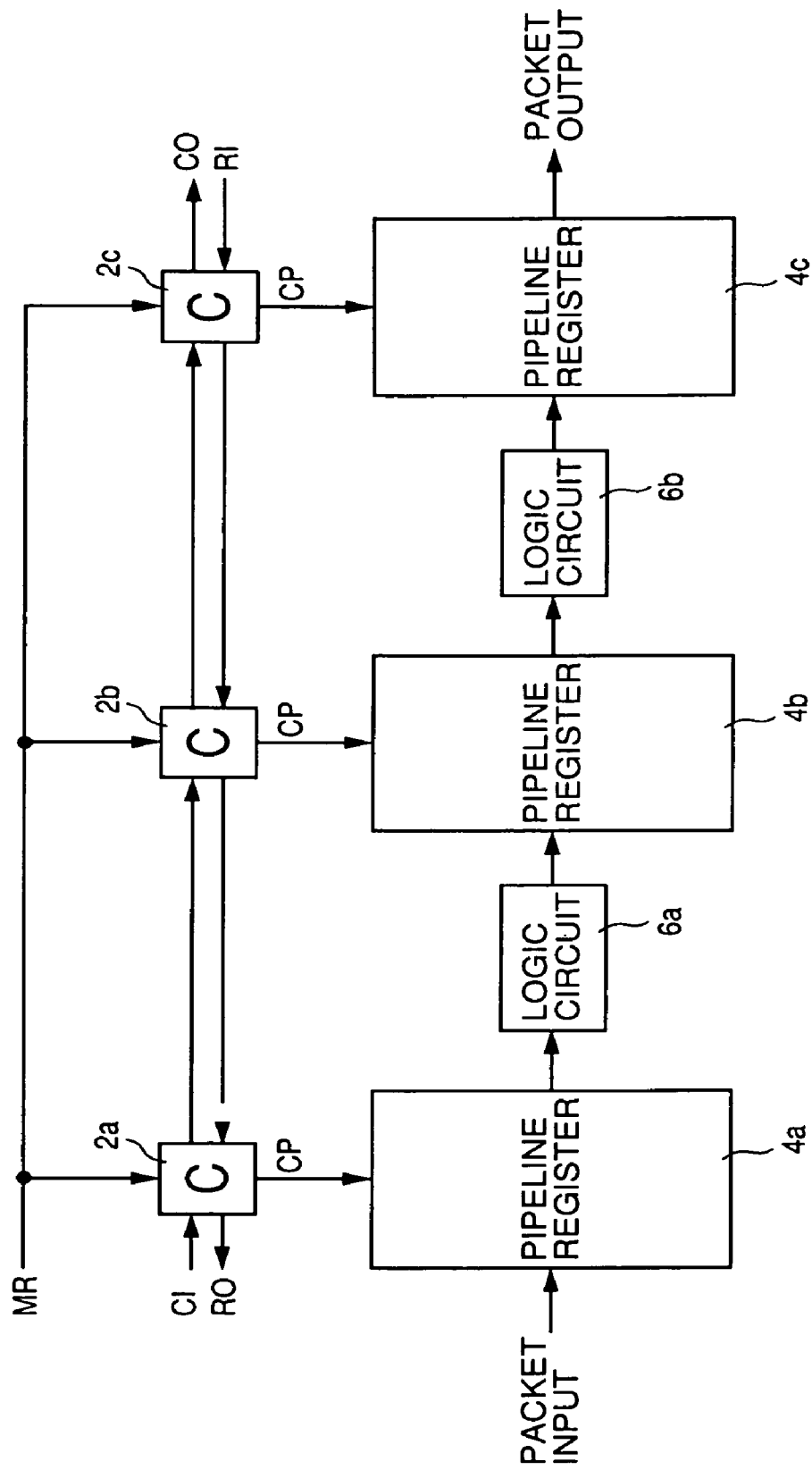
FIG. 8 is a block diagram showing an example of a conventional data transmission apparatus employing the handshake method.
Figure 9:
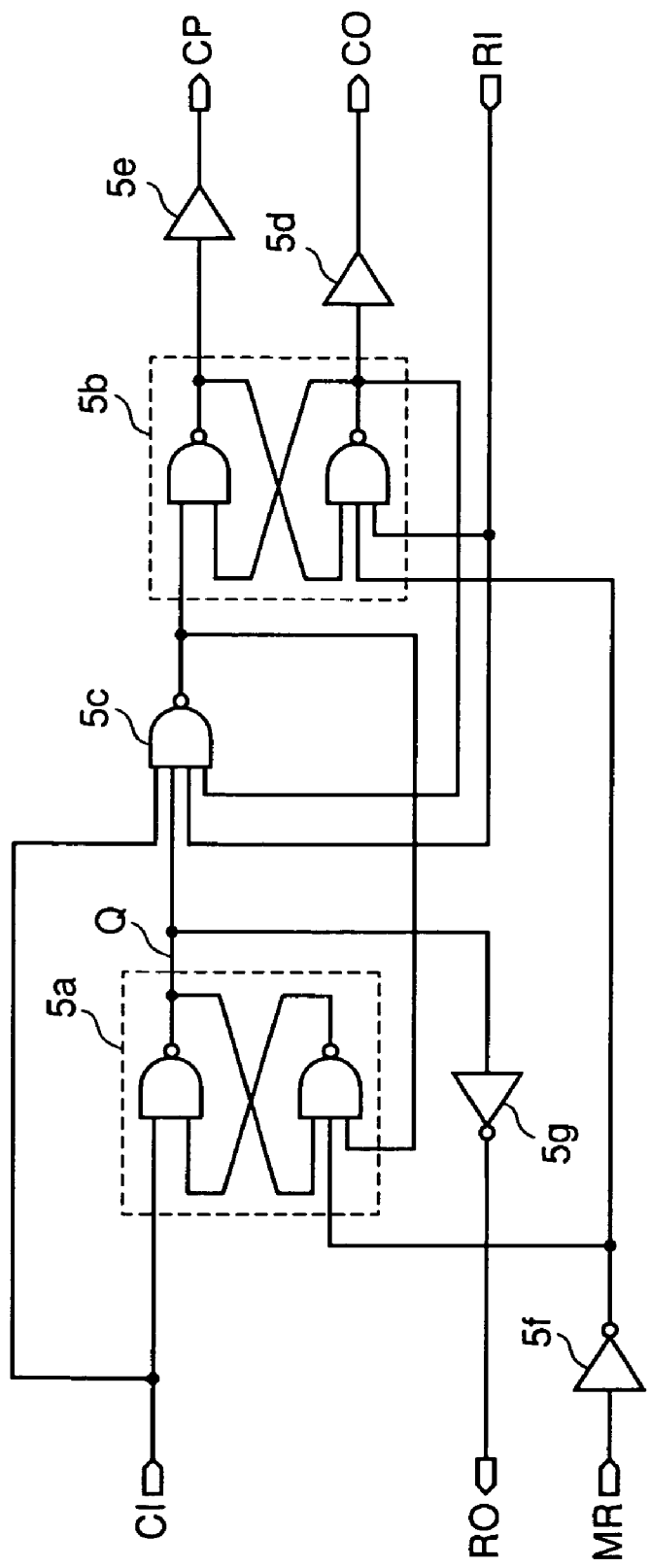
FIG. 9 is a specific circuit diagram of the C element.

In the embodiment shown in FIG. 1, an OR gate 1*f* and host transfer flag operating circuits 1*g* and 1*h* are provided on the data transmission path shown in FIG. 8, and two master reset signals MRa and MRb are used. Except these points, the configuration is the same as that of FIG. 8. Master reset signal MRa corresponds to the master reset signal MR of FIG. 8, and it initializes the data transmission apparatus. Master reset signal MRb initializes only the data transmission path 1a. When master reset signal MRb is applied, host transfer flag operating circuits 1g and 1h operate the host transfer flags of data packets held by the pipeline registers included in pipeline registers 1b and 1c.

The operation of the data transmission apparatus shown in FIG. 1 will be described. While an input packet data is transferred in order of pipeline registers 1a→1b→1c, it is sequentially processed by logic circuits 6a and 6b. C elements 2a to 2c receive pulse-shaped SEND signal from the preceding stage at pulse input terminal CI, and transfer acknowledge output terminal RO provides the ACK signal to the preceding stage. Pulse output terminal CO provides a pulse-shaped SEND signal to the succeeding stage, and transfer acknowledge input terminal RI receives the ACK signal from the succeeding stage.

When a pulse at the "H" level is applied as the master reset signal MRb, a pulse at the "H" level is input to a master reset input terminal MR of C element 2a included in pipeline register 1a through OR gate 1f, and the C element 2a initializes pipeline register 1a in the similar manner as in the prior art, so that the data packet held by the pipeline register is erased. This operation corresponds to the master reset signal MR described in the prior art. As the master reset signal MRa is set to the "H" level, data packets in all the pipeline registers are overwritten and eliminated.

Now, when the newly added master reset signal MRb is set to the "H" level, the master reset signal MRa is at the "L" level at this time. As the master reset signal MRb is input through OR gate 1f only to the C element 2a controlling pipeline register 1a, the data packet in pipeline register 1a is overwritten and eliminated. Thereafter, master reset signal MRb changes to the "L" level.

Thereafter, the master reset signal MRb at the "H" level is input as a control signal (input signal) to the host transfer flag operating circuits 1g and 1h. The host transfer flag operating circuits 1g and 1h are provided on the input side of pipeline registers 1b, 1c, . . . other than pipeline register 1a that is controlled by the C element 2a to which master reset signal MRb is input, respectively.

The host transfer flag operating circuit 1g is formed, for example, by a buffer circuit or a delay circuit and when the master reset signal MRb is input, it outputs the master reset signal as it is. At a rise of the CP as a clock signal of the pipeline register formed by a D type flip-flop, the host transfer flag is taken in by the pipeline register, together with other information (tag field, data field).

Therefore, when the "H" level signal is input as the control signal (input signal) for the host transfer flag operating circuits 1g and 1h, the host transfer flag operating circuits 1g and 1h set the host transfer flag of the data packets held in pipeline registers 1b and 1c to the "H" level. Thereafter, the host transfer flag is detected and when it is at the "H" level, it is forcedly transferred to the host.

Now, the data packet used in one embodiment of the present invention is the data packet including the tag field (destination node number field F1, generation number field F2, instruction code filed F3) and data field (data field F4) shown in FIG. 5, additionally having the host transfer flag. An example, in which the data transmission apparatus of FIG. 1 is applied to the data driven type information processing apparatus PE described with reference to FIG. 10 above, will be described in the following.

Figure 2:
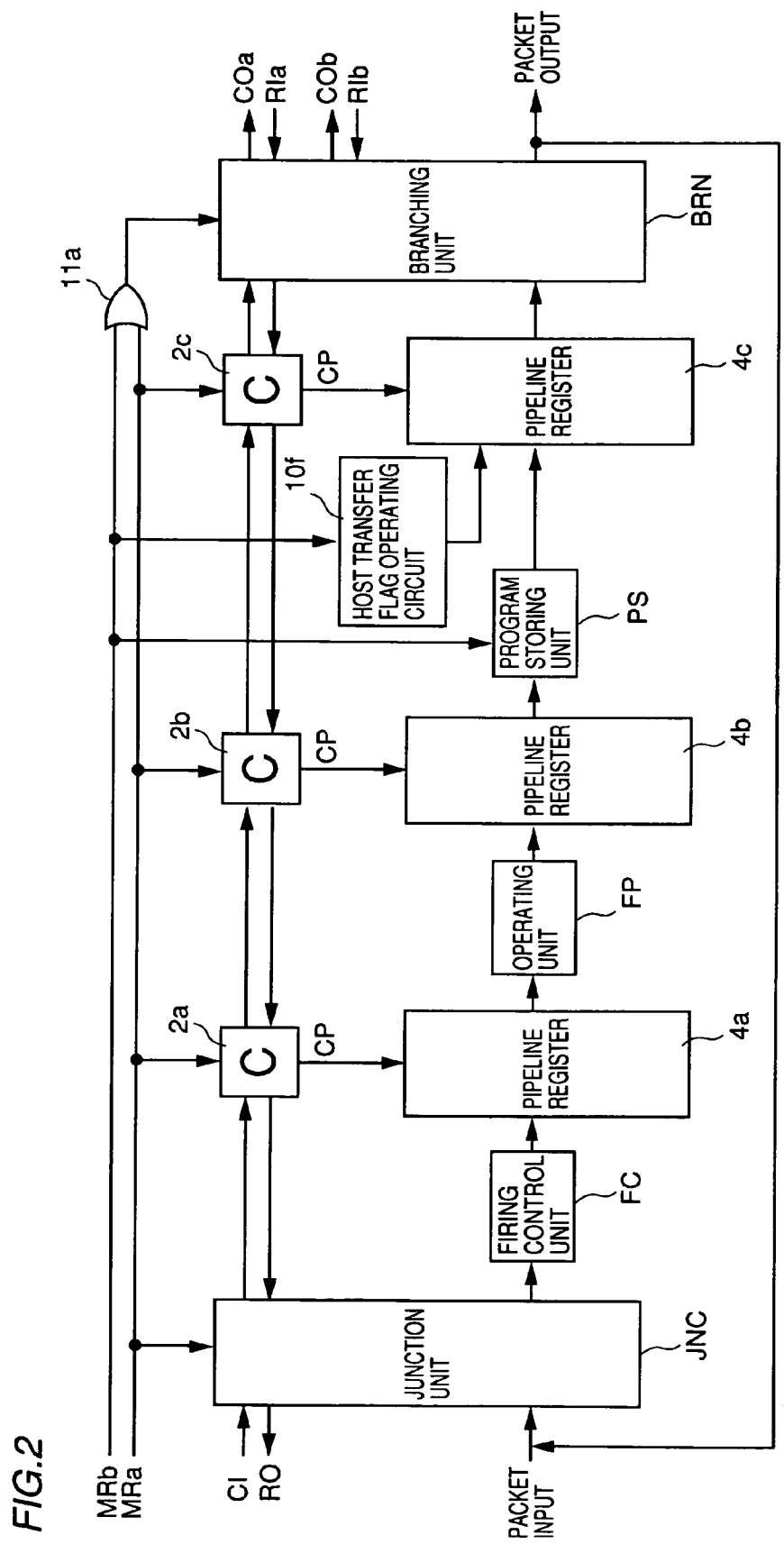
FIG. 2 is a block diagram of a data driven type information processing apparatus using the data transmission apparatus shown in FIG. 1.
Figure 3:
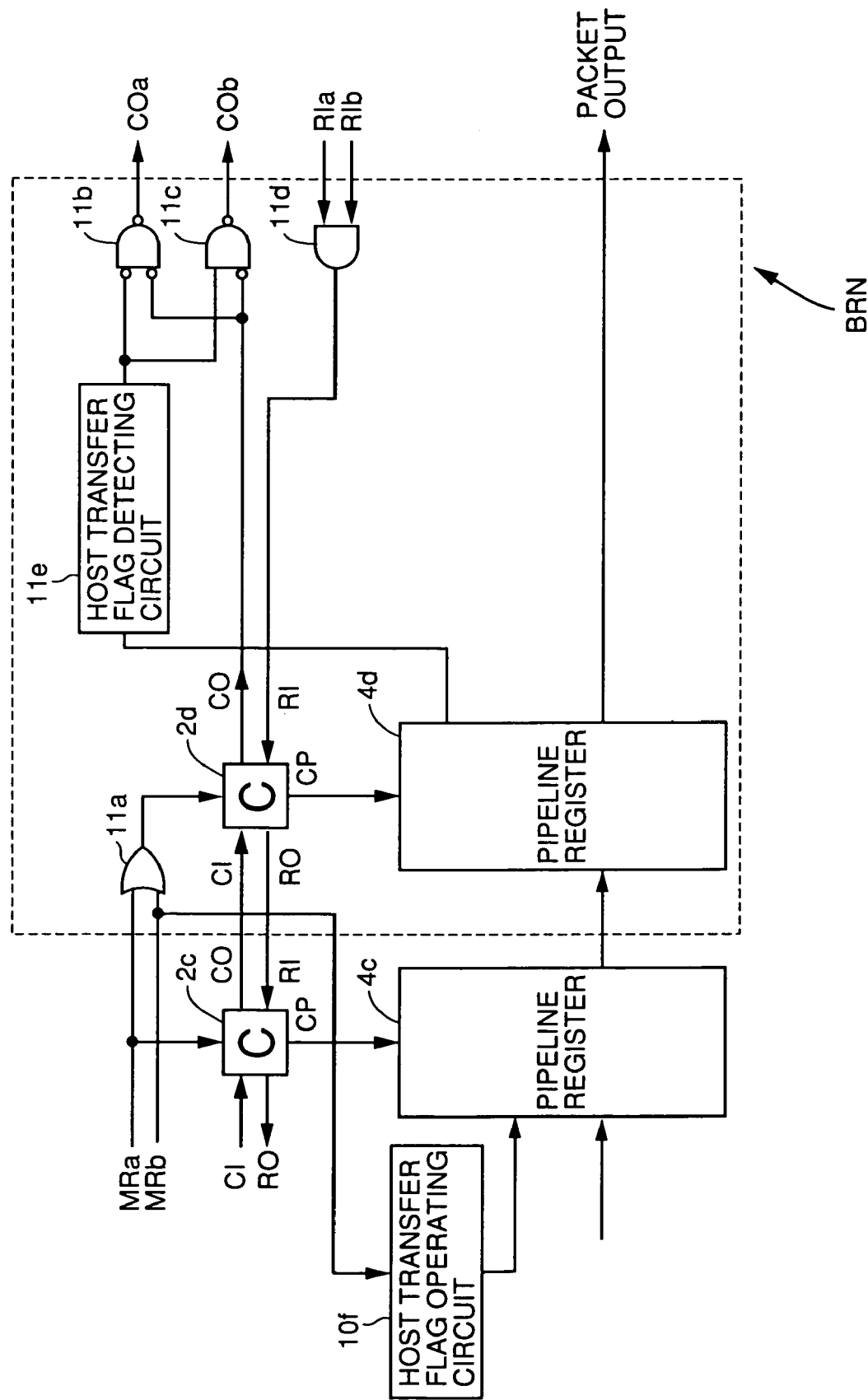
FIG. 3 is a circuit diagram showing only the periphery of a branching unit of the data driven type information processing apparatus shown in FIG. 2.

FIG. 2 is a schematic block diagram of the data driven type information processing apparatus using the data transmission apparatus shown in FIG. 1. FIG. 3 is a circuit diagram showing only the periphery of the branching unit of the data driven type information processing apparatus shown in FIG. 2.

Figure 10:
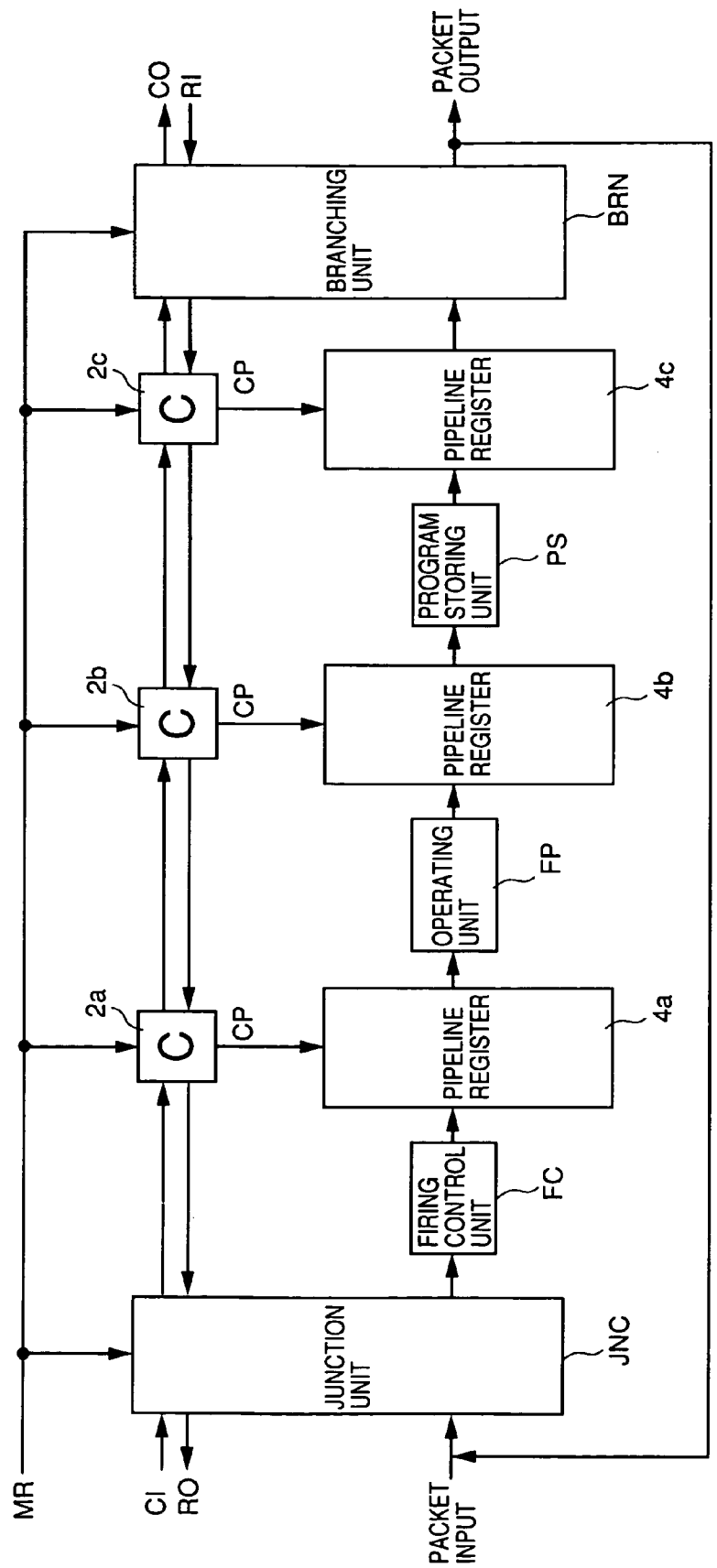
FIG. 10 is a block diagram of a conventional data driven type information processing apparatus.
Figure 11:
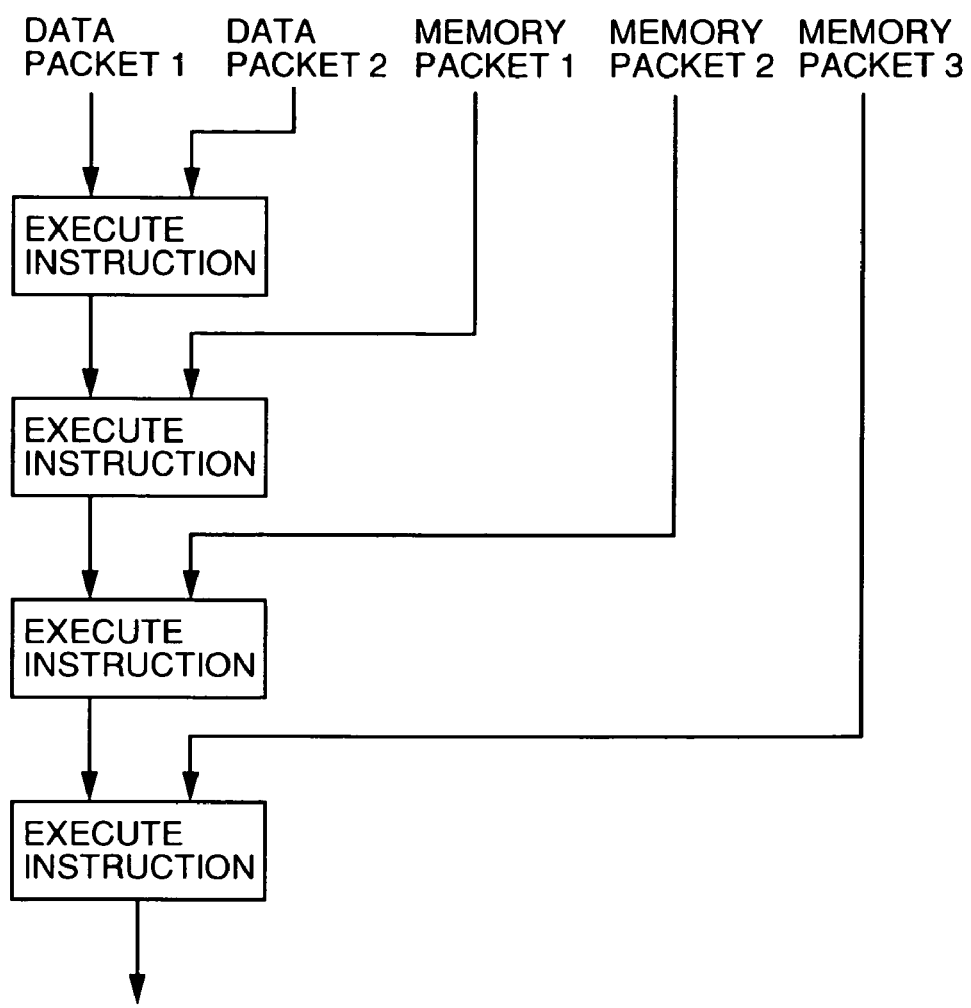
FIG. 11 shows an example of data packet dependency possibly causing a dead-lock state in the conventional data driven type information processing apparatus.

Referring to FIG. 2, the master reset signal MRa corresponds to the master reset signal MR shown in FIG. 10, and it is applied to junction unit JNC, C elements 2a to 2c and one input of OR gate 11a. Master reset signal MRb is input to program storing unit PS, host transfer flag operating circuit 10f and the other input of OR gate 11a. It is understood that OR gate 11a is included in branching unit BRN, as shown in FIG. 3.

Host transfer flag operating circuit 10f is provided in the preceding stage of respective pipeline registers 4a to 4c. In FIG. 2, an example is shown in which the circuit is provided in the preceding stage of pipeline register 4c, and host transfer flag operating circuits provided in the preceding stage of pipeline registers 4a and 4b are omitted in the figure.

In the branching unit BRN, C element 2d and pipeline register 4d are provided and, in addition, gate circuits 11b, 11c and 11d as well as host transfer flag detecting circuit 11e are provided, as shown in FIG. 3.

Host transfer flag detecting circuit 11e detects and latches the host transfer flag at the "H" level output from pipeline register 4d, and applies a signal at the "H" level to one input of each of the gate circuits 11b and 11c. A pulse signal is applied from the terminal CO of C element 2d to the other input of each of gate circuits 11b and 11c. An output of gate circuit 11b is applied to junction unit JNC through terminal Ca, and an output of gate circuit 11c is applied to the outside (host) through terminal Cob. To the terminals RIa and Rib, transfer acknowledge signals are applied from the junction unit JNC and from the outside, respectively, and the transfer acknowledge signals are provided to the RI input of C element 2d through gate circuit 11d.

In FIGS. 2 and 3, the operation of host transfer flag operating circuit 10f is the same as described with reference to FIG. 1. When the dead-lock state occurs because of data dependency or lag in the timing of arrival of the data packets, the master reset signal MRb is set to the "H" level. Thus, the master reset signals MRa and MRb are input to the MR input terminal of C element 2d through OR gate 11a, and the data packet stored in pipeline register 4d in branching unit BRN is overwritten and eliminated.

Thereafter, master reset signal MRb is set to the "L" level. Thus, the data packet stored in the pipeline register 4d in branching unit BRN is overwritten and eliminated, and a data packet having the host transfer flag at the "H" level is newly overwritten and stored in pipeline register 4d.

The data packet set to the "H" level is detected by host transfer flag detecting circuit 11e. When the host transfer flag detecting circuit 11e detects the host transfer flag at the "H" level, it latches the same and provides a "H" level signal. Consequently, gate circuit 11c is rendered active, and the CO output of C element 2d in the branching unit BRN is output from the terminal COb.

In the pipeline register 4b in the preceding stage of pipeline register 4c, which corresponds to the preceding stage of branching unit BRN, the host transfer flag is set to the "H" level simultaneously by the host transfer flag operating circuit 10f provided on the input side, in the similar manner.

As the data driven type information processing apparatus processes data by exchanging transfer request signals and transfer acknowledge signals between C elements, the terminals COb and RIb correspond to the signals from the outside (host), and hence, the data packet is transferred from the data driven type information processing apparatus. When the host transfer flag is at the "L" level, host transfer flag detecting circuit 11e latches and outputs the "L" level. At this time, gate circuit 11b is rendered active, and CO output of C element 2d is output from terminal COa. The terminals Coa and RIa exchange signals with junction unit JNC, and hence data packets are all returned to junction unit JNC. Host transfer flag detecting circuit 11e may have a simple structure such as a latch circuit or a simple delay circuit.

Thus, the data packets are forcedly transmitted to the outside (host), and hence the dead-lock state is solved, and it becomes possible to debug the data on the circulation pipeline in the data driven type information processing apparatus on the outside (host). Generally, in a data driven type information processing apparatus, there are a plurality of data driven type information processing apparatuses PE such as shown in FIG. 10 connected through input/output control units (branching units and junction units) among which signals are exchanged. The transfer to the host here means taking of a signal from the data driven type information processing apparatus to the outside.

As a modification of the host transfer flag operating circuit 10f, it may be formed by a D type flip-flop. The D type flip-flop may be configured such that the input terminal of the flip-flop is connected to a power supply Vcc terminal, the master reset signal MRb is applied to the clock input terminal, and a signal at the "H" level is output from an output terminal of the D type flip-flop when the master reset signal MRb rises. Similar to the operation described above, when CP from the C element rises, the "H" level signal is stored in a prescribed location of the pipeline register.

Here, once the master reset signal MRb attains to the "H" level, the output of the D type flip-flop is maintained at the "H" level even when the master reset signal return to the "L" level thereafter. Thus, the host transfer flag of the data packet transferred and stored in pipeline register 4c thereafter can be set to the "H" level. Only one host transfer flag operating circuit 10f have to be provided in the input stage of pipeline register 4d as the input stage of branching unit BRN, and therefore, the number of host transfer flag operating circuits to be provided can be reduced.

Figure 4:
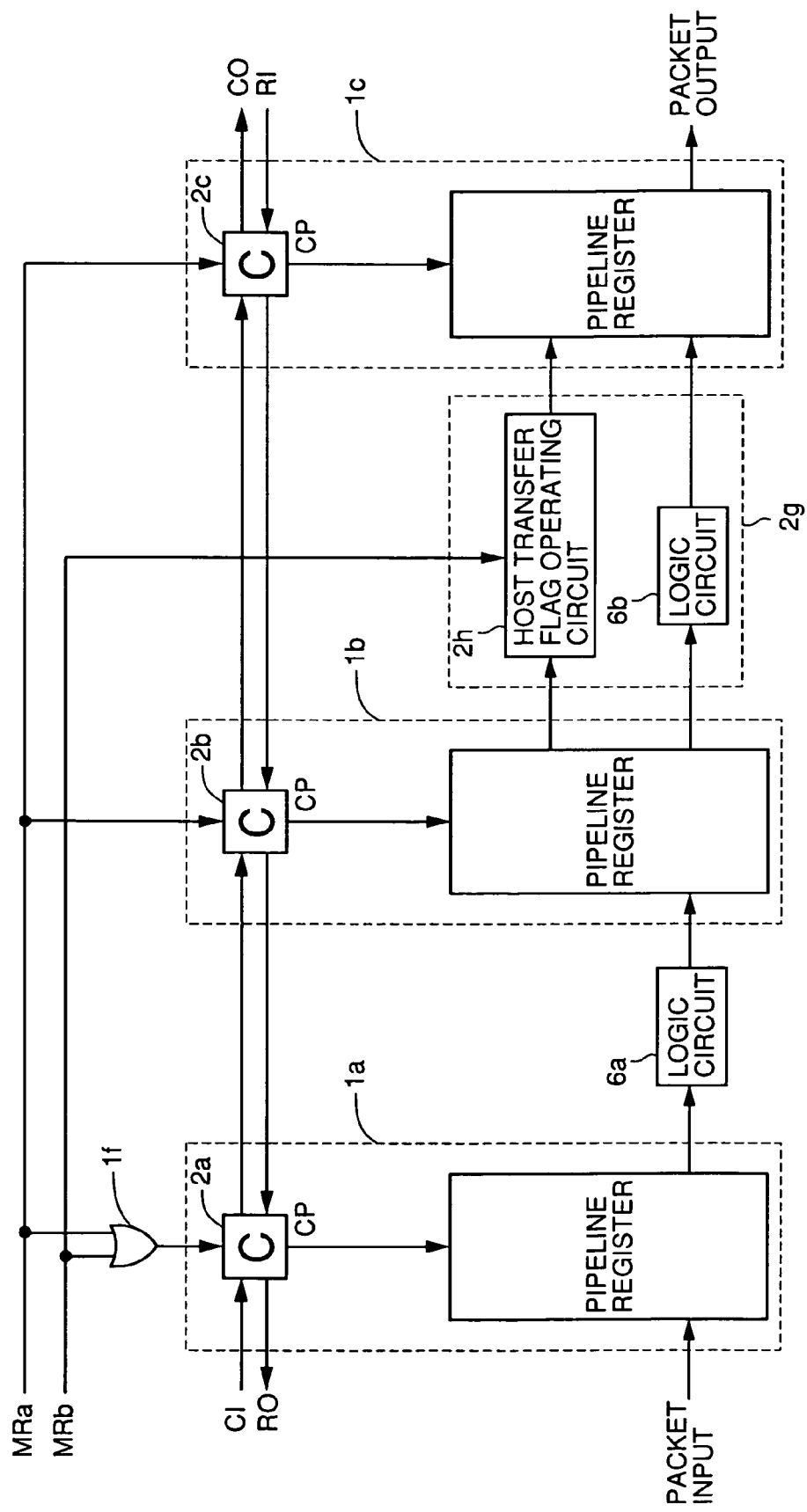
FIG. 4 is a block diagram of a data transmitting apparatus employing the handshake method in accordance with another embodiment of the present invention.

FIG. 4 shows another embodiment of the present invention. In the embodiment shown in FIG. 4, the host transfer flag operating circuit 2h is provided only in the preceding stage of pipeline register 1c, and the host transfer flag operating circuit is not provided in the preceding stage of pipeline register 1b. In this point, the embodiment differs from that of FIG. 1.

To the host transfer flag operating circuits 1g and 1h of FIG. 1, the master reset signal MRb is applied as the control signal, and when a signal at the "H" level is input as the control signal, host transfer flag operating circuits 1g and 1h set the host transfer flag of the data packets held in pipeline registers 1b and 1c to the "H" level.

By contrast, in the embodiment shown in FIG. 4, when the master reset signal MRb as the control signal is at the "L" level, host transfer flag operating circuit 2h stores this state, and it does not operate the host transfer flag of any packet input from pipeline register 1b thereafter, but outputs the packet as it is to pipeline register 1c. Here, the host transfer flag is the initial state of "H" level.

When the control signal at the "H" level is input, host transfer flag operating circuit 2h stores the "H" level, and overwrites the host transfer flag of the data packet input from pipeline register 1b thereafter to the "H" level, which packet is thereafter transferred to pipeline register 1c. At this time, other fields (tag field and data field) of the data packet output from pipeline register 1b are subjected to prescribed processing by logic circuit 6b, and then the packet is transferred to pipeline register 1c. Therefore, the input data packet is subjected to the above described processing in host transfer flag operating circuit 2h and the circuit 2g including the logic circuit 6b, and thereafter, the resulting data packet is output.

The data packet used in the embodiment shown in FIG. 4 has the same configuration as the data packet used in the embodiment shown in FIG. 1.

An example in which the data driven apparatus shown in FIG. 4 is applied to the data driven type information processing apparatus P of FIG. 10 will be described with reference to FIG. 2. In the data driven type information processing apparatus PE of FIG. 2, it is assumed that C element 2a to which two master reset signals MRa and MRb are input through OR circuit 1f and pipeline register 1a to which the C element 2a belongs are in the branching unit BRN.

Host transfer flag operating circuit 2h, on the other hand, is assumed to be included in program storing unit PS. Basically, the operation is the same as in the embodiment shown in FIG. 1. When the dead-lock state occurs because of data dependency or lag in data arrival timing, the master reset signal MRb is set to the "H" level. Thus, the data packet stored in pipeline register 1a in the branching unit BRN, to which C element 2a having the master reset signals MRb and MRb input through OR circuit 1f at MR input terminal, is overwritten and eliminated.

Thereafter, the master reset signal MRb is set to the "L" level. Thus, the data packet stored in the pipeline register of the data transmission path in the branching unit BRN is overwritten and eliminated as already described, and as the host transfer flag of the overwritten data packet is at the "H" level, transfer to the outside is enabled, dissolving the dead-lock state of the circulation pipeline.

When the dead-lock state is dissolved, data packet transfer on the circulation pipeline restarts. When a data packet passes through the program storing unit PS nearest to the branching unit BRN, the host transfer flag of the data packet that is being passed and processed is set to the "H" level, by the "H" level signal stored in host transfer flag operating circuit 2h provided in program storing unit PS. In this example, in addition to the effects of the invention attained by the embodiment and modification described above, degree of freedom in debugging can be increased, as additional adjustment of operation by the change of a software is possible, as the host transfer flag operating circuit 2h is included in the program storing unit PS.

The data packet of which host transfer flag is set to the "H" level has its host transfer flag being "H" level detected by the host transfer flag detecting circuit in the branching unit BRN, and hence, forced to the outside (host) from the data driven type information processing apparatus.

Thus, the dead-lock state is dissolved, and as the data on the circulation pipeline in the data driven type information processing apparatus PE can be obtained at the outside, debugging is possible.

Now, C element to which the master reset signal MRb is input, or the location and the number of host transfer flag operating circuits are not limited. Further, the host transfer flag operating circuit and the host transfer flag detecting circuit can be easily formed by known technique. By providing these components in the branching unit BRN that also serves as an output unit of the input/output control unit, the dead-lock state can be surely dissolved by initializing the data transmission path therein to enable transfer.

As described above, according to the embodiments of the present invention, a function is provided that erases a data packet stored in a pipeline register and outputs other data packets to the outside. Therefore, the dead-lock state of a circulation pipeline can be dissolved and, in addition, other data packet on the circulation pipeline can be transferred to an external host. Thus, information of the data packet that is the cause of the dead-lock state can be easily obtained, and thus a data driven type information processing apparatus having an effective debugging function can be realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus, comprising:
    a self-synchronous transfer control circuit controlling by a transfer request signal and a transfer acknowledge signal transfer and operating processes of a data packet including at least a destination node number, a generation number, an instruction code and data;
    at least one pipeline register controlled by said self-synchronous transfer control circuit, for storing said data packet;
    an input/output control circuit controlling whether said data packet is to be circulated inside said information processing apparatus or output externally from said information processing apparatus; and
    a data packet erasing circuit erasing a data packet stored in said at least one of said pipeline registers and outputting other data packets to the outside from said information processing apparatus wherein
    said data packet erasing circuit includes a master reset input for erasing at least one data packet, adds a new host transfer flag to said data packet, and erases said data packet in accordance with master reset information.

2. The data driven type information processing apparatus according to claim 1, further comprising:
    a plurality of host transfer flag operating circuits overwriting a host transfer flag of other data packet in accordance with said master reset information; and
    a host transfer flag detecting circuit detecting said host transfer flag.

3. The data driven type information processing apparatus according to claim 1, further comprising:
    a host transfer flag operating circuit storing said master reset information, and overwriting and outputting a host transfer flag of another input data packet; and
    a host transfer flag detecting circuit detecting said host transfer flag.

4. The data driven type information processing apparatus according to claim 2, wherein
    said data packet erasing circuit is provided in said input/output control circuit.

5. The data driven type information processing apparatus according to claim 3, wherein
    said transfer flag operating circuit is provided in a block nearest to an outlet of the data driven type information processing apparatus,.

6. A data driven type information processing apparatus, comprising:
    a self-synchronous transfer control circuit controlling by a transfer request signal and a transfer acknowledge signal transfer and operating processes of a data packet including at least a destination node number, a generation number, an instruction code and data;
    a pipeline register controlled by said self-synchronous transfer control circuit, for storing said data packet;
    an input/output control circuit controlling whether said data packet is to be circulated inside said information processing apparatus or output from said information processing apparatus;
    a data packet erasing circuit including a master reset input adding a new host transfer flag to the data packet and erasing at least one data packet, for adding a new host transfer flag to said data packet and erasing said data packet in accordance with master reset information;
    a plurality of host transfer flag operating circuits overwriting a host transfer flag of other data packet in accordance with said master reset information; and
    a host transfer flag detecting circuit detecting said host transfer flag.

7. A data driven type information processing apparatus, comprising:
    a self-synchronous transfer control circuit controlling by a transfer request signal and a transfer acknowledge signal transfer and operating processes of a data packet including at least a destination node number, a generation number, an instruction code and data,;
    a pipeline register controlled by said self-synchronous transfer control circuit for storing said data packet;
    an input/output control circuit controlling whether said data packet is to be circulated inside said information processing apparatus or output from said information processing apparatus;
    a data packet erasing circuit including a master reset input for adding a new host transfer flag to a data packet and erasing at least one data packet, for adding a new host transfer flag to said data packet and erasing said data packet in accordance with master reset information;
    a host transfer flag operating circuit storing said master reset information, and overwriting and outputting the host transfer flag of input other data packet; and
    a host transfer flag detecting circuit detecting said host transfer flag.

8. A data driven type information processing apparatus, comprising:
    (1) A self-synchronous transfer control circuit controlling by a transfer request signal and a transfer acknowledge signal transfer and operating processes of a data packet including at least a destination node number, a generation number, an instruction code and data;
    (2) At least one pipeline register controlled by said self-synchronous transfer control circuit, for storing said data packet;

(3) An input/output control circuit outputting said data packet from said information processing apparatus when said data packet includes a host transfer flag in addition to the destination node number and the generation number; and (4) A data packet erasing circuit erasing a data packet stored in said at least one pipeline register and outputting other data packets from said information processing apparatus.

9. The data driven type information processing apparatus of claim 8 wherein said data packet erasing circuit includes a master reset input for erasing at least one data packet, adds a new host transfer flag to said data packet, and erases said data packet in accordance with master reset information.

10. The data driven type information processing apparatus according to claim 9, further comprising:

a plurality of host transfer flag operating circuits overwriting a host transfer flag of other data packets in accordance with said master reset information; and a host transfer flag detecting circuit detecting said host transfer flag.

11. A method of operating a data driven type information processing apparatus, comprising the steps of:

(1) Providing a self-synchronous transfer control circuit;

(2) Controlling by a transfer request signal and a transfer acknowledge signal transfer and operating processes of at least one data packet including at least a destination node number, a generation number, an instruction code and data;

(3) Providing at least one pipeline register controlled by said self-synchronous transfer control circuit, for storing said at least one data packet; and (4) when a dead-lock state occurs:

(a) Erasing a first one of said at least one data packet stored in said at least one pipeline register; and (b) Outputting a second one of said at least one data packet from said information processing apparatus to an external host when said data packet includes a host transfer flag in addition to the destination node number and the generation number.

* * * * *